United States Patent [19]

Johnson

[11] Patent Number: 4,843,187
[45] Date of Patent: Jun. 27, 1989

[54] GASKET ASSEMBLY AND ELECTRICAL POWER TRANSFORMER INCLUDING THE SAME

[75] Inventor: Wendell D. Johnson, Rochester, N.Y.

[73] Assignee: Qualitrol Corporation, Fairport, N.Y.

[21] Appl. No.: 152,668

[22] Filed: Feb. 5, 1988

[51] Int. Cl.⁴ .................. H01F 27/02; F16K 25/00
[52] U.S. Cl. .................. 174/11 R; 29/157.1 R; 251/364; 277/50; 277/189; 336/58
[58] Field of Search .......... 174/11 R, 17 CT; 29/156.7 A, 157.1 R, 460, 530; 137/469, 493.9, 516.29, 533.31; 251/359, 364; 277/1, 12, 50, 72 FM, 170, 171, 177, 189, 237 R; 285/379; 49/489; 123/188 S; 220/378; 336/58, 59, 94

[56] References Cited

U.S. PATENT DOCUMENTS

| | | | |
|---|---|---|---|
| 1,601,960 | 10/1926 | Gold | 277/189 X |
| 1,608,424 | 11/1926 | Putnam | 137/533.31 X |
| 1,751,664 | 3/1930 | Smith | 123/188 S |
| 1,811,166 | 6/1931 | Yardley | 137/533.31 X |
| 1,948,628 | 2/1934 | Penick et al. | 251/359 X |
| 2,065,870 | 12/1936 | Parr | 220/378 X |
| 2,451,276 | 10/1948 | Crowley | 137/516.29 X |
| 2,621,011 | 12/1952 | Smith | 251/359 X |
| 3,095,619 | 7/1963 | Peterson | 277/1 |
| 3,217,082 | 11/1965 | King et al. | 174/11 R |
| 3,914,528 | 10/1975 | Johnson | 174/11 R |
| 4,259,984 | 4/1981 | Pemberton et al. | 251/364 X |
| 4,676,266 | 6/1987 | Johnson | 174/11 R X |

Primary Examiner—Laramie E. Askin
Attorney, Agent, or Firm—Charles L. Johnson, Jr.

[57] ABSTRACT

A gasket assembly including a base having a central opening and a circular slot having an undercut portion extending around the central opening, a circular gasket positioned in the circular slot and having a tapered side located proximate the undercut portion, and cementitious sealant material abutting the tapered side of the gasket and in the undercut portion for retaining the gasket in the slot. The gasket assembly is especially useful for the seal for the pressure relief valve of an electrical power transformer.

2 Claims, 2 Drawing Sheets

GASKET ASSEMBLY AND ELECTRICAL POWER TRANSFORMER INCLUDING THE SAME

FIELD OF INVENTION

This invention relates generally to sealing gasket assemblies and more particularly to sealing gasket assemblies used in electrical power transformers. In power transformers a pressure tight seal is needed when the valve used in the device is closed or seated. When a sudden increase in pressure occurs within the power transformer, the valve must react quickly to relieve the pressure in the transformer without destroying the seal mechanism or dislodging any gasket material which may be involved.

PRIOR ART

One example of a prior art gasket assembly is shown in U.S. Pat. No. 3,217,082 issued Nov. 9, 1965. In that patent it may be seen in FIG. 1 that a gasket 25 sits in a circular slot in the ring 23 of the tubular base 13. Under certain circumstances of rapid opening and closing the gasket 25 may come loose from its slot.

SUMMARY OF THE INVENTION

This invention involves the use of a five-sided, in cross section, circular gasket in a circular slot having an undercut portion formed in the valve base of an electrical power transformer, the gasket being secured with epoxy or other cementitious sealant material to mechanically increase the retention of the gasket in the valve base of the electrical power transformer.

DETAILED DESCRIPTION OF THE INVENTION

Figure 1:
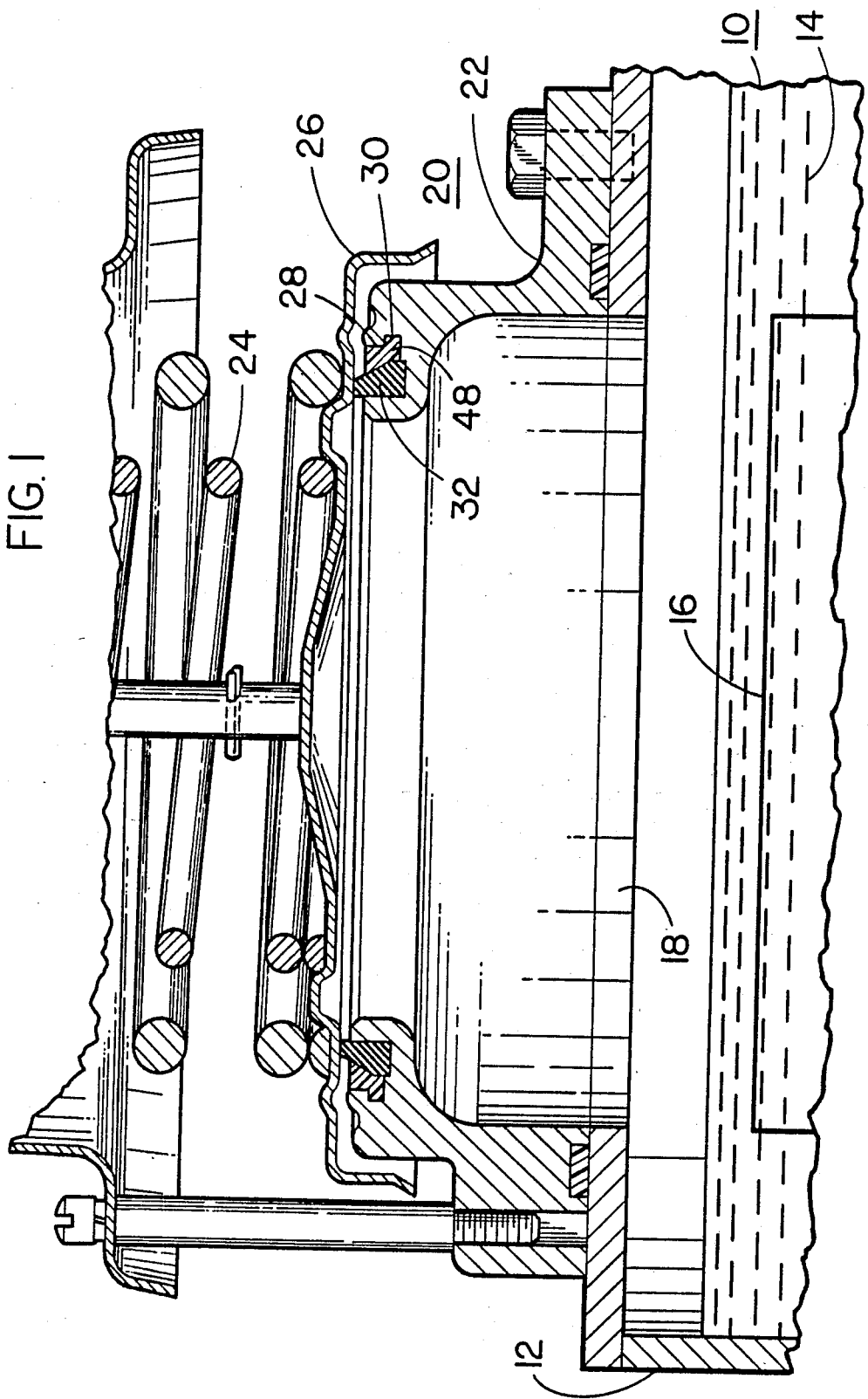
FIG. 1 is a partial cross-sectional view of an electrical power transformer including a gasket assembly according to the invention.

The invention will be described with reference to FIGS. 1 and 2 in which an electrical power transformer includes the gasket assembly of the invention to provide a pressure tight seal.

The electrical power transformer 10 comprises a housing 12 having cooling fluid 14 and a transformer element 16. A circular relief valve 20 nests in and is mounted on the circular housing opening 18. The pressure relief valve 20 is made up of a tubular base 22 and includes a spring 24 which acts against the disc valve 26 to keep the valve normally closed.

A circular slot 28 is formed in the tubular base 22 to receive a gasket 32. A circular slot 28 includes an undercut portion 30.

Figure 2:
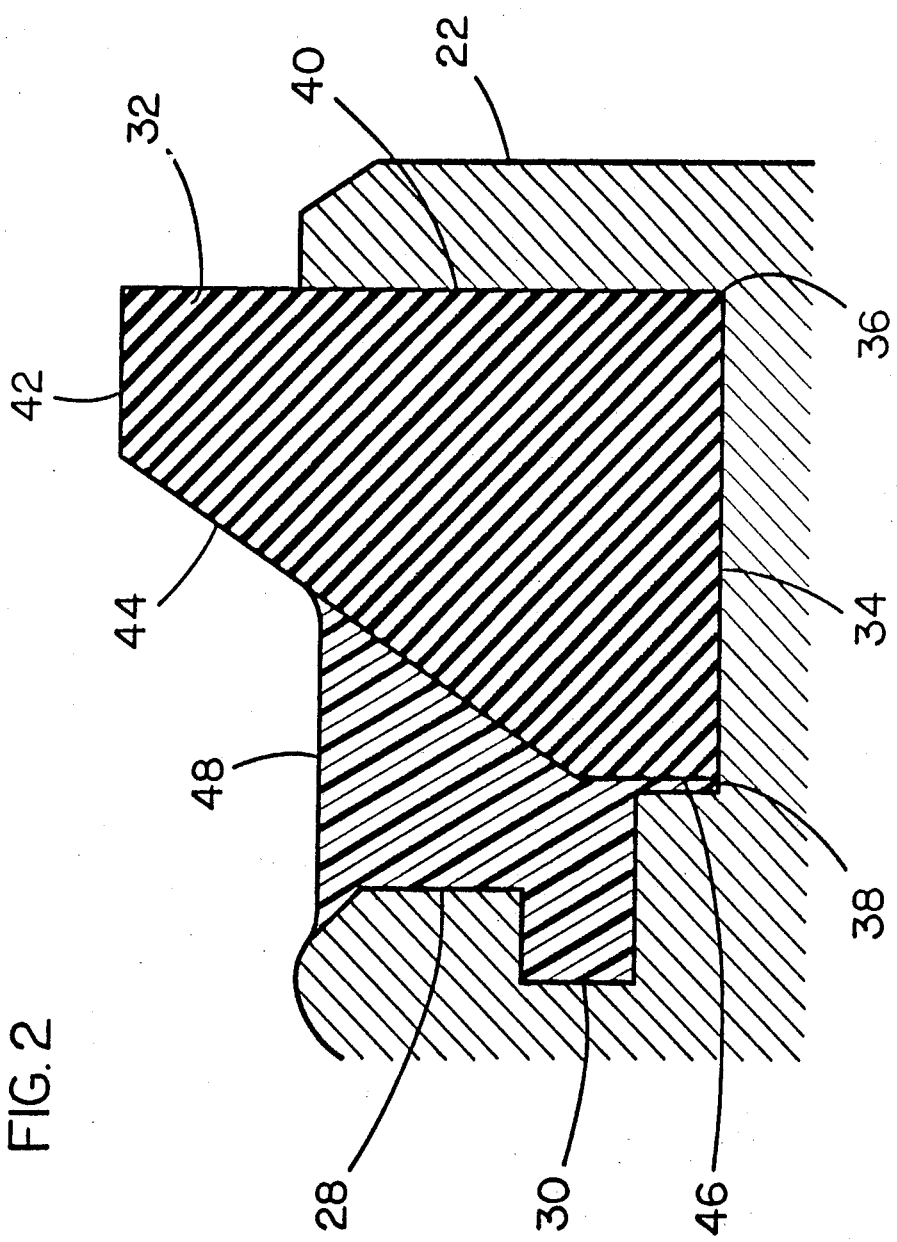
FIG. 2 is a detailed cross-sectional view, on an enlarged scale, of a portion of the gasket assembly of the invention.

The resilient circular gasket 32, in the preferred embodiment, in cross section, is a five-sided gasket which may be seen, with reference to FIG. 2, to have a base portion 34 with first and second corners 36 and 38. The normally horizontal base portion 34 of gasket 32 normally rests in the slot 28 of tubular base 22. A substantially vertical longest side 40 extends from the first corner 36 of the base side to a position corresponding to the closed position of the movable disc valve member 26. The normally horizontal top side 42 of the gasket 32 normally abuts the valve member 26 when the valve is in the closed position.

A tapered side 44 of the gasket 32 extends from the top side 42 to a position further from the substantially vertical side 40 than the top side 42.

A substantially vertical side 46 extends from the tapered side 44 to the second corner 38 of the base side 34.

With the gasket 32 in the slot 28, epoxy or other cementitious sealant material 48 is flowed into the opening between the gasket 32 and the slot 28 and into the undercut 30 of the slot 28.

When the epoxy or other cementitious sealant material hardens, it and the gasket are both securely retained so that even violent excursions of the valve or extreme pressure from the transformer housing will not destroy or dislodge the gasket from the tubular base 22.

This gasket assembly helps the power transformer to operate safely under conditions of extreme pressure variations.

In carrying out the invention, steps involved include forming a circular slot 28 in the base 22, the slot 28 including an undercut portion 30; inserting a five-sided, in cross sections resilient, circular gasket 32 in the circular slot; and flowing epoxy or other cementitious sealant material 48 over a portion of the gasket 32 and into the undercut 30 and remaining slot 28 so that when the epoxy or other cementitious sealant material hardens, the gasket 32 is retained securely in the slot 28.

The invention thereby attains the goal of retaining a gasket in position during extreme operating conditions of an electrical power transformer valve.

What is claimed is:

1. The combination comprising:
   an electrical power transformer including a housing containing cooling fluid in which a transformer element is immersed,
   a pressure relief valve comprising a tubular base mounted in surrounding and sealing relationship to a circular opening formed in the housing, the base having an opening leading into the housing,
   the base having a circular slot with an undercut portion formed therein,
   a circular gasket having a tapered side positioned in the circular slot,
   epoxy material between the base and tapered side of the gasket and in the undercut portion for retaining the gasket in the slot,
   a spring, and
   a disk valve normally biased into engagement with the gasket by the spring.

2. The combination comprising:
   a base member having a substantially circular central opening and a circular slot formed therein surrounding the central opening, the circular slot having a side wall, a base, and an undercut portion;
   a circular gasket having a side, a base, and a tapered portion, the gasket being mounted within the slot such that the gasket side abuts the slot side wall, the gasket base abuts the slot base, and the gasket tapered portion is proximate the undercut portion of the slot; and
   cementitious sealant material abutting the gasket tapered portion and within the undercut portion of the slot, whereby the gasket is securely retained in a position relative to the base member.

* * * * *